US012607304B2

(12) United States Patent
Li et al.

(10) Patent No.: US 12,607,304 B2
(45) Date of Patent: Apr. 21, 2026

(54) PRODUCTION AND TRANSPORTATION SYSTEM FOR NATURAL GAS HYDRATES

(71) Applicant: GUANGZHOU INSTITUTE OF ENERGY CONVERSION, CHINESE ACADEMY OF SCIENCES, Guangzhou (CN)

(72) Inventors: Xiaosen Li, Guangzhou (CN); Yisong Yu, Guangzhou (CN); Jianwu Liu, Guangzhou (CN); Wenzhe Sun, Guangzhou (CN); Zhaoyang Chen, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 234 days.

(21) Appl. No.: 18/657,866

(22) Filed: May 8, 2024

(65) Prior Publication Data

US 2025/0122982 A1 Apr. 17, 2025

Related U.S. Application Data

(63) Continuation of application No. PCT/CN2023/131909, filed on Nov. 16, 2023.

(30) Foreign Application Priority Data

Oct. 13, 2023 (CN) ........................ 202311325765.8

(51) Int. Cl.

| | |
|---|---|
| ***F17C 11/00*** | (2006.01) |
| ***C10L 3/10*** | (2006.01) |
| ***F17C 3/00*** | (2006.01) |

(52) U.S. Cl.

CPC ............ *F17C 11/007* (2013.01); *C10L 3/108* (2013.01); *F17C 3/005* (2013.01);

(Continued)

(58) Field of Classification Search

CPC .. F17C 11/007; F17C 3/005; F17C 2221/033; F17C 2221/036; F17C 2227/0316; C10L 3/108

See application file for complete search history.

(56) References Cited

U.S. PATENT DOCUMENTS

2018/0001972 A1* 1/2018 Fishler ...................... B63B 5/00
2018/0009511 A1* 1/2018 Kang ..................... B63H 21/38

FOREIGN PATENT DOCUMENTS

CN 102371934 A 3/2012
CN 101955827 B 2/2013

(Continued)

*Primary Examiner* — Kyle Armstrong

(74) *Attorney, Agent, or Firm* — Bayramoglu Law Offices LLC

(57) ABSTRACT

A production and transportation system for natural gas hydrates includes a gas storage reservoir, a plurality of hydrate storage and transportation tanks, a refrigerator, a pressure regulating valve, a liquid storage tank, a living quarter/surrounding user, a hydrate storage reservoir, a plurality of connecting pipes, a plurality of one-way gas valves, one-way liquid valves, and optional liquid pumps. The plurality of hydrate storage and transportation tanks are connected in parallel through the connecting pipes and then connected with an output end of the gas storage reservoir through the pressure regulating valve, the liquid storage tank is connected with the optional liquid pump and then sequentially connected with the plurality of hydrate storage and transportation tanks, and the plurality of hydrate storage and transportation tanks are connected in parallel and then connected with an input end of the living quarter/surrounding user through the optional liquid pump.

7 Claims, 1 Drawing Sheet

(52) U.S. Cl.
CPC .. *F17C 2221/033* (2013.01); *F17C 2221/036* (2013.01); *F17C 2227/0316* (2013.01)

(56) References Cited

FOREIGN PATENT DOCUMENTS

| | | | | |
|---|---|---|---|---|
| CN | 103571557 B | 12/2014 | | |
| CN | 106010698 A | 10/2016 | | |
| CN | 108638948 A | 10/2018 | | |
| WO | WO-2020124660 A1 * | 6/2020 | .............. | C10L 3/108 |

* cited by examiner

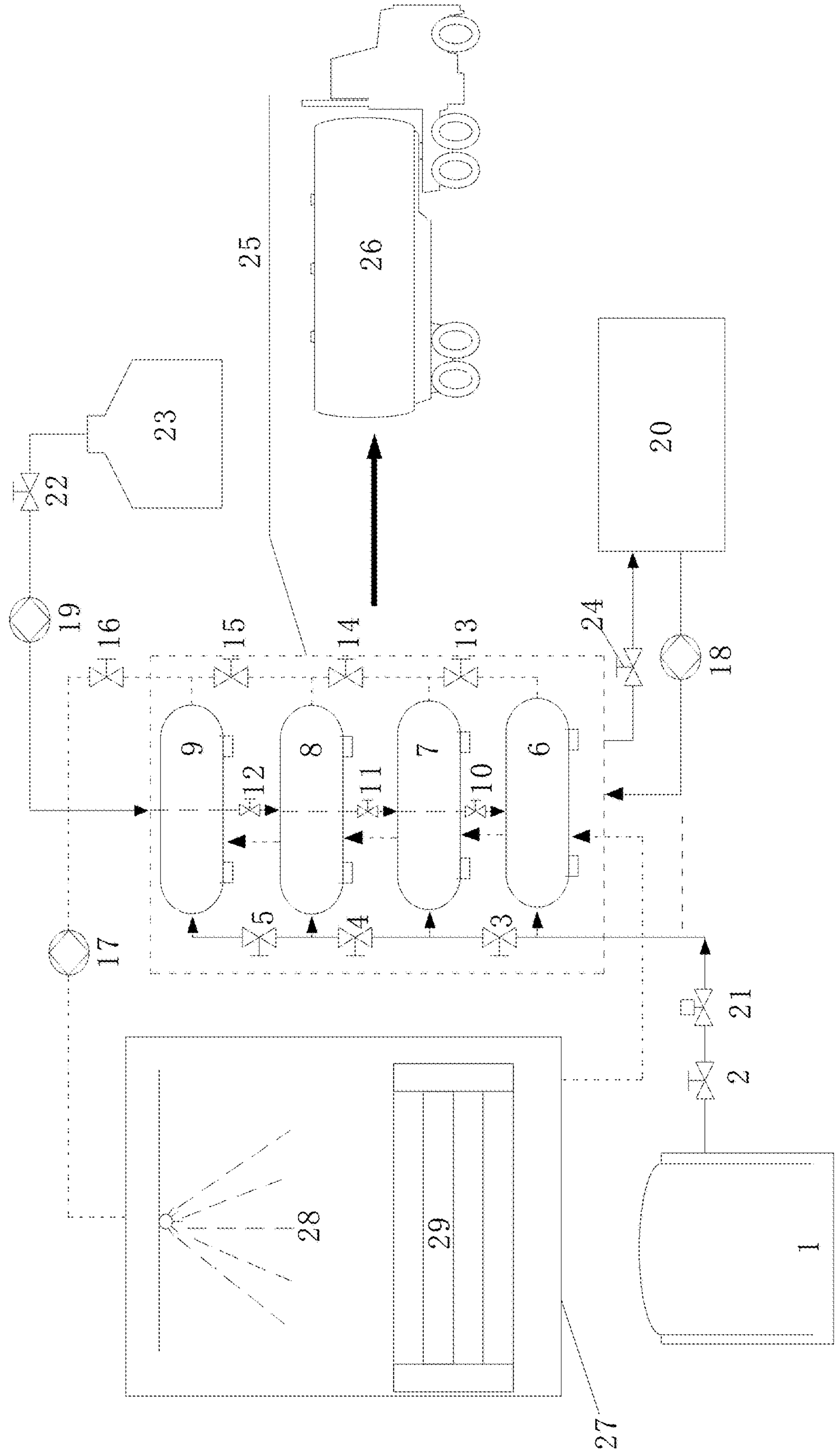
1
2
3
4
5
6
7
8
9
10
11
12
13
14
15
16
17
18
19
20
21
22
23
24
25
26
27
28
29

PRODUCTION AND TRANSPORTATION SYSTEM FOR NATURAL GAS HYDRATES

CROSS REFERENCE TO THE RELATED APPLICATIONS

This application is a continuation application of International Application No. PCT/CN2023/131909, filed on Nov. 16, 2023, which is based upon and claims priority to Chinese Patent Application No. 202311325765.8, filed on Oct. 13, 2023, the entire contents of which are incorporated herein by reference.

TECHNICAL FIELD

The present invention relates to the technical field of solidified storage and transportation equipment of natural gas hydrates, in particular to a production and transportation system for natural gas hydrates.

BACKGROUND

The solidified storage and transportation technology for natural gas hydrates is a new type of storage and transportation technology for natural gas. Compared with liquefied natural gas and compressed natural gas, this technology has the advantages of short process flow, low cost and no pollution. The technology is mainly based on the principle that gas is fixed in the hydrates under certain temperature and pressure conditions, and transported for a long distance in the form of solid hydrates. Therefore, the production and transportation system for the hydrates is a key to the implementation of the solidified storage and transportation technology for natural gas hydrates. How to generate the gas hydrates efficiently and quickly on a large scale and transport economically is a key scientific problem to be solved in developing this technology.

Aiming at large-scale production problem of the gas hydrates, patent “Method for Preparing Solid Natural Gas Hydrates” (Publication No. CN101955827B) provides a method of generating solid hydrates from dehydrated and desulfurized natural gas under the action of a molding assistant, namely ethylene glycol by using a hydrate method, and then molding and granulating for transportation. Although the applicant thought that this method can realize continuous generation of the natural gas hydrates and is beneficial to the large-scale production of the gas hydrates, the core content thereof is only a hydrate generation reactor, and the whole natural gas hydrate production end is not integrated and optimized. At the same time, the use of ethylene glycol will greatly increase generation pressure of the gas hydrates and a high gas storage capacity of the hydrates cannot be guaranteed. Patent “Apparatus for Rapid Synthesis of Natural Gas Hydrates” (Publication No. CN106010698A) designs an apparatus for rapid generation of natural gas hydrates by stirring. Although the apparatus can obtain the gas hydrates quickly under laboratory conditions, the use of a stirrer will consume a lot of energy, which is not suitable for industrial mass production. Moreover, the hydrate reactor is only focused similarly, and the gas hydrate production end is not subjected to integrated design. Patent “Method for Preparing Natural Gas Hydrates” (Publication No. CN103571557B) provides a bubbling gas hydrate reactor and a granulation manner for obtaining hydrate solid particles by freezing with liquid nitrogen. However, due to poorer controllability and lower cost of a bubbling process, this method has lower feasibility in industrial practice. Aiming at the transportation problem of the gas hydrates, patent “Transportation Vehicle for Transporting Natural Gas Hydrates” (Publication No. CN102371934A) provides a manner of transforming a vehicle carriage into a cold reservoir, and putting a storage and transportation tank loaded with the hydrates in the carriage for transportation. This transportation manner can meet the requirements of long-distance transportation of the hydrates, is also relatively flexible and can be conveniently matched with a hydrate production system, but the refrigeration of the whole carriage will undoubtedly consume a lot of cold energy, and the economy cannot be guaranteed. Patent “Tank Transportation Vehicle for Natural Gas Hydrates” (Publication No. CN108638948A) designs a tank transportation vehicle with a refrigeration system for the natural gas hydrates. A spiral stirrer is arranged in an inner tank body to beat and stir solid particles in a hydrate slurry in the inner tank body, which is mainly suitable for the storage and transportation of the hydrate slurry. The existence of a large amount of water in the slurry will undoubtedly increase a transportation cost of the natural gas per cubic meter. At the same time, the compatibility of the transportation vehicle with the production end of the natural gas hydrates needs to be further evaluated. Therefore, it is urgent to develop an economical and efficient production and transportation system for the natural gas hydrates, which can meet the requirements of industrial application practice of the solidified storage and transportation technology for the natural gas hydrates.

SUMMARY

An objective of the present invention is to provide an economical and efficient production and transportation system for natural gas hydrates, which can meet the requirements of industrial application practice of a solidified storage and transportation technology for natural gas hydrates, aiming at the problem of large-scale hydrate production and transportation that needs to be solved urgently in the industrialization process of the solidified storage and transportation technology for natural gas hydrates in combination with the existing hydrate research foundation direction.

The present invention is realized by the following technical solution: a production and transportation system for natural gas hydrates includes a gas storage reservoir, hydrate storage and transportation tanks, a refrigerator, a pressure regulating valve, a liquid storage tank, a living quarter/surrounding user, a hydrate storage reservoir, a plurality of connecting pipes, a plurality of one-way gas valves, one-way liquid valves and optional liquid pumps; wherein a plurality of hydrate storage and transportation tanks are arranged, first input ends of the plurality of hydrate storage and transportation tanks are connected in parallel through the connecting pipes and then connected with an output end of the gas storage reservoir through the pressure regulating valve, and an output end of the liquid storage tank is connected with the optional liquid pump and then sequentially connected with second input ends of the plurality of hydrate storage and transportation tanks through the connecting pipes and the one-way liquid valves; output ends of the plurality of hydrate storage and transportation tanks are connected in parallel through the connecting pipes and then connected with an input end of the living quarter/surrounding user through the optional liquid pump, and an output end of the living quarter/surrounding user is sequentially connected with third input ends of the plurality of hydrate storage and transportation tanks; the one-way gas valves are respectively arranged on the connecting pipes connected in parallel between the first input ends of the hydrate storage and transportation tanks and the gas storage reservoir; the one-way liquid valves are respectively arranged on the connecting pipes connected in parallel with the output ends of the hydrate storage and transportation tanks; the refrigerator is connected with the hydrate storage reservoir to refrigerate the hydrate storage reservoir, a natural gas hydrate transportation vehicle is stored in the hydrate storage reservoir, and the hydrate storage and transportation tanks are transferred to the natural gas hydrate transportation vehicle after the hydrates are generated; water-insoluble hydrate thermodynamic additives are added in the hydrate storage and transportation tanks, and a density of the water-insoluble hydrate thermodynamic additives is less than a density of water; and bottoms of the hydrate storage and transportation tanks are provided with valves and valve covers for closing the valves.

The hydrate storage and transportation tanks include a first hydrate storage and transportation tank, a second hydrate storage and transportation tank, a third hydrate storage and transportation tank and a fourth hydrate storage and transportation tank; the one-way gas valves include a first one-way gas valve, a second one-way gas valve, a third one-way gas valve and a fourth one-way gas valve;

the output end of the gas storage reservoir is connected with an input end of the first one-way gas valve, and an output end of the first one-way gas valve is connected with an input end of the pressure regulating valve; a first output end of the pressure regulating valve is connected with an input end of the second one-way gas valve, and a second output end of the pressure regulating valve is connected with a first input end of the first hydrate storage and transportation tank; a first output end of the second one-way gas valve is connected with an input end of the third one-way gas valve, and a second output end of the second one-way gas valve is connected with a first input end of the second hydrate storage and transportation tank; a first output end of the third one-way gas valve is connected with an input end of the fourth one-way gas valve, and a second output end of the third one-way gas valve is connected with a first input end of the third hydrate storage and transportation tank; an output end of the fourth one-way gas valve is connected with a first input end of the fourth hydrate storage and transportation tank;

the one-way liquid valves include a first one-way liquid valve, a second one-way liquid valve, a third one-way liquid valve, a fourth one-way liquid valve, a fifth one-way liquid valve, a sixth one-way liquid valve, a seventh one-way liquid valve, an eighth one-way liquid valve and a ninth one-way liquid valve; the optional liquid pumps include a first optional liquid pump, a second optional liquid pump and a third optional liquid pump;

the output end of the liquid storage tank is connected with an input end of the eighth one-way liquid valve; an output end of the eighth one-way liquid valve is connected with an input end of the third optional liquid pump; a first output end of the third optional liquid pump is connected with a second input end of the fourth hydrate storage and transportation tank, and a second output end of the third optional liquid pump is connected with an input end of the third one-way liquid valve; a first output end of the third one-way liquid valve is connected with a second input end of the third hydrate storage and transportation tank, and a second output end of the third one-way liquid valve is connected with an input end of the second one-way liquid valve; a first output end of the second one-way liquid valve is connected with a second input end of the second hydrate storage and transportation tank, and a second output end of the second one-way liquid valve is connected with an input end of the first one-way liquid valve; and an output end of the first one-way liquid valve is connected with a second input end of the first hydrate storage and transportation tank.

The output end of the living quarter/surrounding user is connected with a third input end of the first hydrate storage and transportation tank, a first output end of the first hydrate storage and transportation tank is connected with a third input end of the second hydrate storage and transportation tank, and a first output end of the second hydrate storage and transportation tank is connected with a third input end of the third hydrate storage and transportation tank; a first output end of the third hydrate storage and transportation tank is connected with a third input end of the fourth hydrate storage and transportation tank, and an output end of the fourth hydrate storage and transportation tank is connected with a first input end of the seventh one-way liquid valve; an output end of the seventh one-way liquid valve is connected with an input end of the first optional liquid pump; an output end of the first optional liquid pump is connected with the input end of the living quarter/surrounding user; a second output end of the first hydrate storage and transportation tank is connected with an input end of the fourth one-way liquid valve, and an output end of the fourth one-way liquid valve is connected with a first input end of the fifth one-way liquid valve; a second output end of the second hydrate storage and transportation tank is connected with a second input end of the fifth one-way liquid valve, and an output end of the fifth one-way liquid valve is connected with a first input end of the sixth one-way liquid valve; and a second output end of the third hydrate storage and transportation tank is connected with a second input end of the sixth one-way liquid valve, and an output end of the sixth one-way liquid valve is connected with a second input end of the seventh one-way liquid valve.

The hydrate storage reservoir is connected with an input end of the ninth one-way liquid valve, and an output end of the ninth one-way liquid valve is connected with an input end of the refrigerator; an output end of the refrigerator is connected with an input end of the second optional liquid pump, and an output end of the second optional liquid pump is connected with an input end of the hydrate storage reservoir.

The hydrate storage reservoir adopts a semi-underground storage reservoir, and a temperature control range of the semi-underground storage reservoir is 273.15K-293.15K.

The living quarter/surrounding user includes a radiator/floor radiator and shower water.

The hydrate storage and transportation tanks are gas hydrate production and transportation-integrated tanks, and the hydrate storage and transportation tanks are detachably installed on the natural gas hydrate transportation vehicle.

Compared with the prior art, the present invention has the following advantages:

(1) The present invention designs a complete hydrate production and transportation system, which can meet the requirements of large-scale hydrate production and transportation in an industrial application process of the natural gas hydrates.

(2) The integrated design of the hydrate production and transportation tanks avoids a hydrate granulation process, shortens a hydrate production and transportation process flow, and greatly reduces a hydrate transportation cost.

(3) The use of the water-insoluble hydrate thermodynamic additives can ensure the convenient separation of the additives and water after the hydrates are transported to a destination, thereby greatly reducing a loss of the additives and the hydrate transportation cost.

BRIEF DESCRIPTION OF THE DRAWINGS

FIGURE is a structural schematic diagram according to an embodiment of the present invention.

The meanings of reference signs in the FIGURE: 1, gas storage reservoir; 2, first one-way gas valve; 3, second one-way gas valve; 4, third one-way gas valve; 5, fourth one-way gas valve; 6, first hydrate storage and transportation tank; 7, second hydrate storage and transportation tank; 8, third hydrate storage and transportation tank; 9, fourth hydrate storage and transportation tank; 10, first one-way liquid valve; 11, second one-way liquid valve; 12, third one-way liquid valve; 13, fourth one-way liquid valve; 14, fifth one-way liquid valve; 15, sixth one-way liquid valve; 16, seventh one-way liquid valve; 17, first optional liquid pump; 18, second optional liquid pump; 19, third optional liquid pump; 20, refrigerator; 21, pressure regulating valve; 22, eighth one-way liquid valve; 23, liquid storage tank; 24, ninth one-way liquid valve; 25, semi-underground storage reservoir; 26, natural gas hydrate transportation vehicle; 27, living quarter/surrounding user; 28, shower water, 29, radiator/floor radiator.

DETAILED DESCRIPTION OF THE EMBODIMENTS

In the following, the contents of the present invention will be further described in detail in combination with the accompanying drawings and specific embodiments.

EMBODIMENT

Referring to the FIGURE, a production and transportation system for natural gas hydrates includes a gas storage reservoir 1, hydrate storage and transportation tanks, a refrigerator 20, a pressure regulating valve 21, a liquid storage tank 23, a living quarter/surrounding user 27, a hydrate storage reservoir, a plurality of connecting pipes, a plurality of one-way gas valves, one-way liquid valves and optional liquid pumps; wherein a plurality of hydrate storage and transportation tanks are arranged, first input ends of the plurality of hydrate storage and transportation tanks are connected in parallel through the connecting pipes and then connected with an output end of the gas storage reservoir 1 through the pressure regulating valve 21, and an output end of the liquid storage tank 23 is connected with the optional liquid pump and then sequentially connected with second input ends of the plurality of hydrate storage and transportation tanks through the connecting pipes and the one-way liquid valves; output ends of the plurality of hydrate storage and transportation tanks are connected in parallel through the connecting pipes and then connected with an input end of the living quarter/surrounding user 27 through the optional liquid pump, and an output end of the living quarter/surrounding user 27 is sequentially connected with third input ends of the plurality of hydrate storage and transportation tanks; the one-way gas valves are respectively arranged on the connecting pipes connected in parallel between the first input ends of the hydrate storage and transportation tanks and the gas storage reservoir 1; the one-way liquid valves are respectively arranged on the connecting pipes connected in parallel with the output ends of the hydrate storage and transportation tanks; the refrigerator 20 is connected with the hydrate storage reservoir to refrigerate the hydrate storage reservoir, a natural gas hydrate transportation vehicle 26 is stored in the hydrate storage reservoir, and the hydrate storage and transportation tanks are transferred to the natural gas hydrate transportation vehicle 26 after the hydrates are generated.

The hydrate storage and transportation tanks include a first hydrate storage and transportation tank 6, a second hydrate storage and transportation tank 7, a third hydrate storage and transportation tank 8 and a fourth hydrate storage and transportation tank 9; the one-way gas valves include a first one-way gas valve 2, a second one-way gas valve 3, a third one-way gas valve 4 and a fourth one-way gas valve 5;

the output end of the gas storage reservoir 1 is connected with an input end of the first one-way gas valve 2, and an output end of the first one-way gas valve 2 is connected with an input end of the pressure regulating valve 21; a first output end of the pressure regulating valve 21 is connected with an input end of the second one-way gas valve 3, and a second output end of the pressure regulating valve 21 is connected with a first input end of the first hydrate storage and transportation tank 6; a first output end of the second one-way gas valve 3 is connected with an input end of the third one-way gas valve 4, and a second output end of the second one-way gas valve 3 is connected with a first input end of the second hydrate storage and transportation tank 7; a first output end of the third one-way gas valve 4 is connected with an input end of the fourth one-way gas valve 5, and a second output end of the third one-way gas valve 4 is connected with a first input end of the third hydrate storage and transportation tank 8; an output end of the fourth one-way gas valve 5 is connected with a first input end of the fourth hydrate storage and transportation tank 9;

the one-way liquid valves include a first one-way liquid valve 10, a second one-way liquid valve 11, a third one-way liquid valve 12, a fourth one-way liquid valve 13, a fifth one-way liquid valve 14, a sixth one-way liquid valve 15, a seventh one-way liquid valve 16, an eighth one-way liquid valve 22 and a ninth one-way liquid valve 24; the optional liquid pumps include a first optional liquid pump 17, a second optional liquid pump 18 and a third optional liquid pump 19;

the output end of the liquid storage tank 23 is connected with an input end of the eighth one-way liquid valve 22; an output end of the eighth one-way liquid valve 22 is connected with an input end of the third optional liquid pump 19; a first output end of the third optional liquid pump 19 is connected with a second input end of the fourth hydrate storage and transportation tank 9, and a second output end of the third optional liquid pump 19 is connected with an input end of the third one-way liquid valve 12; a first output end of the third one-way liquid valve 12 is connected with a second input end of the third hydrate storage and transportation tank 8, and a second output end of the third one-way liquid valve 12 is connected with an input end of the second one-way liquid valve 11; a first output end of the second one-way liquid valve 11 is connected with a second input end of the second hydrate storage and transportation tank 7, and a second output end of the second one-way liquid valve 11 is connected with an input end of the first one-way liquid valve 10; and an output end of the first one-way liquid valve 10 is connected with a second input end of the first hydrate storage and transportation tank 6.

The output end of the living quarter/surrounding user 27 is connected with a third input end of the first hydrate storage and transportation tank 6, a first output end of the first hydrate storage and transportation tank 6 is connected with a third input end of the second hydrate storage and transportation tank 7, and a first output end of the second hydrate storage and transportation tank 7 is connected with a third input end of the third hydrate storage and transportation tank 8; a first output end of the third hydrate storage and transportation tank 8 is connected with a third input end of the fourth hydrate storage and transportation tank 9, and an output end of the fourth hydrate storage and transportation tank 9 is connected with a first input end of the seventh one-way liquid valve 16; an output end of the seventh one-way liquid valve 16 is connected with an input end of the first optional liquid pump 17; an output end of the first optional liquid pump 17 is connected with the input end of the living quarter/surrounding user 27; a second output end of the first hydrate storage and transportation tank 6 is connected with an input end of the fourth one-way liquid valve 13, and an output end of the fourth one-way liquid valve 13 is connected with a first input end of the fifth one-way liquid valve 14; a second output end of the second hydrate storage and transportation tank 7 is connected with a second input end of the fifth one-way liquid valve 14, and an output end of the fifth one-way liquid valve 14 is connected with a first input end of the sixth one-way liquid valve 15; and a second output end of the third hydrate storage and transportation tank 8 is connected with a second input end of the sixth one-way liquid valve 15, and an output end of the sixth one-way liquid valve 15 is connected with a second input end of the seventh one-way liquid valve 16.

The hydrate storage reservoir is connected with an input end of the ninth one-way liquid valve 24, and an output end of the ninth one-way liquid valve 24 is connected with an input end of the refrigerator 20; an output end of the refrigerator 20 is connected with an input end of the second optional liquid pump 18, and an output end of the second optional liquid pump 18 is connected with an input end of the hydrate storage reservoir.

The hydrate storage reservoir adopts a semi-underground storage reservoir 25, and a temperature control range of the semi-underground storage reservoir 25 is 273.15K-293.15K.

The living quarter/surrounding user 27 includes a radiator/floor radiator 29 and shower water 28. In this embodiment, the equipment in the region of the living quarter/surrounding user 27 mainly include hot water, radiator heating (i.e., the radiator/floor radiator 29) and other equipment used by employees.

The hydrate storage and transportation tanks are gas hydrate production and transportation-integrated tanks, and the hydrate storage and transportation tanks are detachably installed on the natural gas hydrate transportation vehicle 26. In this embodiment, the hydrate storage and transportation tanks can be conveniently detached from and installed on the natural gas hydrate transportation vehicle 26. When transportation is needed, the hydrate storage and transportation tanks are installed on the transportation vehicle for transportation, and tank bodies can be taken down and put into the storage reservoir for hydrate production after the hydrates are completely unloaded. The hydrate storage and transportation tanks are in a unified customized standard, which requires any hydrate transportation tank to be capable of cooperating with the transportation vehicle conveniently.

Water-insoluble hydrate thermodynamic additives are added in the hydrate storage and transportation tanks, and a density of the water-insoluble hydrate thermodynamic additives is less than a density of water; and bottoms of the hydrate storage and transportation tanks are provided with valves and valve covers for closing the valves. In this embodiment, the design manner of the hydrate storage and transportation tanks has clear requirements on the used hydrate thermodynamic additives, that is, the water-insoluble hydrate thermodynamic additives are used (in this embodiment, cyclopentane, propane, tetrahydrothiophene or trimethylene sulfide are selected as the water-insoluble hydrate thermodynamic additives). On one hand, after the gas hydrates are transported to a destination, the tank bodies need to be transported back after the gas is decomposed and unloaded. In this process, if water is transported back together, the energy consumption will increase greatly. On the other hand, after the gas is unloaded, the thermodynamic additives also need to be recycled, and resetting of a recycling apparatus will undoubtedly greatly increase the cost. It is much more convenient to use the water-insoluble hydrate thermodynamic additives. After gas unloading is completed, since the water-insoluble hydrate thermodynamic additives usually float on a water surface, as long as the valves are opened at the bottoms of the tank bodies to discharge the water, the thermodynamic additives can be conveniently kept in the tank bodies, thereby solving the above two problems. The bottom of the hydrate storage and transportation tank may be provided with a liquid level sensor. When opening the valve, an operator can discharge part or most of the water by experience, and then cover the valve to transport the tank body back. Alternatively, according to the use of the liquid level sensor, the operator can close the valve after ensuring that a liquid level in the tank reaches the minimum setting standard after discharging most of the water, so as to avoid discharging the water-insoluble hydrate thermodynamic additives, thereby reducing the mass of the tank body, the energy consumption and the cost.

In this embodiment, the number of the hydrate storage and transportation tanks may be set according to an actual production situation. In this embodiment, only the case of four hydrate storage and transportation tanks is listed. The hydrate storage and transportation tanks can withstand a certain pressure, which enables the hydrates to better adapt to needs of an external environment during transportation, and the safety and effectiveness are more guaranteed.

The operation mode of this embodiment is as follows:

(1) The gas hydrate reaction liquid or additive enters the fourth hydrate storage and transportation tank 9 from the liquid storage tank 23 through the seventh one-way liquid valve 16 under power provided by the third optional liquid pump 19, and enters the third hydrate storage and transportation tank 8, the second hydrate storage and transportation tank 7 and the first hydrate storage and transportation tank 6 respectively through the third one-way liquid valve 12, the second one-way liquid valve 11 and the first one-way liquid valve 10 to complete a liquid feeding process in the hydrate storage and transportation tanks.

(2) After the liquid feeding process is completed, the gas flows out from the gas storage reservoir 1, enters the first hydrate storage and transportation tank 6 through the first one-way gas valve 2 and the pressure regulating valve 21, and reaches a set pressure. At the same time, the gas enters the second hydrate storage and transportation tank 7, the third hydrate storage and transportation tank 8 and the fourth hydrate storage and transportation tank 9 respectively through the second one-way gas valve 3, the third one-way gas valve 4 and the fourth one-way gas valve 5 to reach the set pressure. It is worth noting that the design maximum withstanding pressure of the gas storage reservoir 1 should be higher than 10 MPa. When the gas pressure in storage and transportation tank is lower than the set pressure of the hydrate storage and transportation tank, a booster pump may be used to boost the pressure. In view of current actual conditions of a natural gas transportation end, the pressure is generally much higher than the set pressure. Therefore, the booster pump is not listed in the present invention.

(3) At the same time when the gas feeding and liquid feeding processes are completed, a refrigeration system (mainly including the refrigerator 20, the ninth one-way liquid valve 24 and the second optional liquid pump 18) is turned on to refrigerate the semi-underground storage reservoir 25. A refrigeration temperature is controlled at 273.15K-293.15K, and a preferred temperature is 278.15 k.

(4) After the above process is completed, the hydrate begins to be generated in the hydrate storage and transportation tanks. The heat released by gas hydrate generation in the first hydrate storage and transportation tank 6, the second hydrate storage and transportation tank 7, the third hydrate storage and transportation tank 8 and the fourth hydrate storage and transportation tank 9 is converged into a main pipe through the fourth one-way liquid valve 13, the fifth one-way liquid valve 14 and the sixth one-way liquid valve 15 respectively, and enters the region of the living quarter/surrounding user 27 for use by users through the seventh one-way liquid valve 16 under the action of the first optional liquid pump 17, and the heat may be used for heating, heat supply and the shower water 28, etc.

(5) After the hydrate with high gas content is generated, the hydrate storage and transportation tanks are directly placed on the natural gas hydrate transportation vehicle 26 for long-distance transportation, and the hydrates are decomposed and unloaded after being transported to the destination. After the hydrate decomposition and unloading is completed, the valves at the bottoms of the hydrate storage and transportation tanks are opened to discharge water. After the water is completely discharged, the valves are closed to keep the water-insoluble hydrate thermodynamic additives in the tank bodies.

(6) The transported hydrate storage and transportation tanks only contain the thermodynamic additives and can be placed in a filling station of solidified natural gas for filling. After the transportation vehicle arrives at the filling station, the empty tanks are unloaded and placed in the semi-underground storage reservoir 25, and another hydrate storage and transportation tank finishing the production is placed on the transportation vehicle and carried away. It should be noted that the completion of this process requires the standardization and normalization of the hydrate storage and transportation tanks and the transportation vehicle for convenient matching use.

The above detailed descriptions are concrete descriptions of the feasible embodiment of the present invention, and the embodiment is not intended to limit the patent scope of the present invention. Any equivalent implementations or changes not departing from the present invention shall be included in the patent scope of this case.

The invention claimed is:

1. A production and transportation system for natural gas hydrates, comprising a gas storage reservoir, a plurality of hydrate storage and transportation tanks, a refrigerator, a pressure regulating valve, a liquid storage tank, a living quarter/surrounding user, a hydrate storage reservoir, a plurality of connecting pipes, a plurality of one-way gas valves, a plurality of one-way liquid valves, and a plurality of optional liquid pumps; wherein first input ends of the plurality of hydrate storage and transportation tanks are connected in parallel through a first plurality of connecting pipes of the plurality of connecting pipes and then connected with an output end of the gas storage reservoir through the pressure regulating valve, and an output end of the liquid storage tank is connected with a third optional liquid pump and then sequentially connected with second input ends of the plurality of hydrate storage and transportation tanks through a second plurality of connecting pipes of the plurality of connecting pipes and the plurality of one-way liquid valves; output ends of the plurality of hydrate storage and transportation tanks are connected in parallel through a third plurality of connecting pipes of the plurality of connecting pipes and then connected with an input end of the living quarter/surrounding user through a first optional liquid pump, and an output end of the living quarter/surrounding user is sequentially connected with third input ends of the plurality of hydrate storage and transportation tanks; the plurality of one-way gas valves are respectively arranged on the first plurality of connecting pipes connected in parallel between the first input ends of the plurality of hydrate storage and transportation tanks and the gas storage reservoir; the plurality of one-way liquid valves are respectively arranged on the second plurality of connecting pipes connected in parallel with the output ends of the plurality of hydrate storage and transportation tanks; the refrigerator is connected with the hydrate storage reservoir to refrigerate the hydrate storage reservoir, a natural gas hydrate transportation vehicle is stored in the hydrate storage reservoir, and the plurality of hydrate storage and transportation tanks are transferred to the natural gas hydrate transportation vehicle after the natural gas hydrates are generated; water-insoluble hydrate thermodynamic additives are added in the plurality of hydrate storage and transportation tanks, and a density of the water-insoluble hydrate thermodynamic additives is less than a density of water; and bottoms of the plurality of hydrate storage and transportation tanks are provided with valves and valve covers for closing the valves.

2. The production and transportation system for the natural gas hydrates according to claim 1, wherein:

the plurality of hydrate storage and transportation tanks comprise a first hydrate storage and transportation tank, a second hydrate storage and transportation tank, a third hydrate storage and transportation tank, and a fourth hydrate storage and transportation tank; the plurality of one-way gas valves comprise a first one-way gas valve, a second one-way gas valve, a third one-way gas valve, and a fourth one-way gas valve;

the output end of the gas storage reservoir is connected with an input end of the first one-way gas valve, and an output end of the first one-way gas valve is connected with an input end of the pressure regulating valve; a first output end of the pressure regulating valve is connected with an input end of the second one-way gas valve, and a second output end of the pressure regulating valve is connected with a first input end of the first hydrate storage and transportation tank; a first output end of the second one-way gas valve is connected with an input end of the third one-way gas valve, and a second output end of the second one-way gas valve is connected with a first input end of the second hydrate storage and transportation tank; a first output end of the third one-way gas valve is connected with an input end of the fourth one-way gas valve, and a second output end of the third one-way gas valve is connected with a first input end of the third hydrate storage and transportation tank; an output end of the fourth one-way gas valve is connected with a first input end of the fourth hydrate storage and transportation tank;

the plurality of one-way liquid valves comprise a first one-way liquid valve, a second one-way liquid valve, a third one-way liquid valve, a fourth one-way liquid valve, a fifth one-way liquid valve, a sixth one-way liquid valve, a seventh one-way liquid valve, an eighth one-way liquid valve, and a ninth one-way liquid valve; the plurality of optional liquid pumps comprise the first optional liquid pump, a second optional liquid pump, and the third optional liquid pump;

the output end of the liquid storage tank is connected with an input end of the eighth one-way liquid valve; an output end of the eighth one-way liquid valve is connected with an input end of the third optional liquid pump; a first output end of the third optional liquid pump is connected with a second input end of the fourth hydrate storage and transportation tank, and a second output end of the third optional liquid pump is connected with an input end of the third one-way liquid valve; a first output end of the third one-way liquid valve is connected with a second input end of the third hydrate storage and transportation tank, and a second output end of the third one-way liquid valve is connected with an input end of the second one-way liquid valve; a first output end of the second one-way liquid valve is connected with a second input end of the second hydrate storage and transportation tank, and a second output end of the second one-way liquid valve is connected with an input end of the first one-way liquid valve; and an output end of the first one-way liquid valve is connected with a second input end of the first hydrate storage and transportation tank.

3. The production and transportation system for the natural gas hydrates according to claim 2, wherein the output end of the living quarter/surrounding user is connected with a third input end of the first hydrate storage and transportation tank, a first output end of the first hydrate storage and transportation tank is connected with a third input end of the second hydrate storage and transportation tank, and a first output end of the second hydrate storage and transportation tank is connected with a third input end of the third hydrate storage and transportation tank; a first output end of the third hydrate storage and transportation tank is connected with a third input end of the fourth hydrate storage and transportation tank, and an output end of the fourth hydrate storage and transportation tank is connected with a first input end of the seventh one-way liquid valve; an output end of the seventh one-way liquid valve is connected with an input end of the first optional liquid pump; an output end of the first optional liquid pump is connected with the input end of the living quarter/surrounding user; a second output end of the first hydrate storage and transportation tank is connected with an input end of the fourth one-way liquid valve, and an output end of the fourth one-way liquid valve is connected with a first input end of the fifth one-way liquid valve; a second output end of the second hydrate storage and transportation tank is connected with a second input end of the fifth one-way liquid valve, and an output end of the fifth one-way liquid valve is connected with a first input end of the sixth one-way liquid valve; and a second output end of the third hydrate storage and transportation tank is connected with a second input end of the sixth one-way liquid valve, and an output end of the sixth one-way liquid valve is connected with a second input end of the seventh one-way liquid valve.

4. The production and transportation system for the natural gas hydrates according to claim 2, wherein the hydrate storage reservoir is connected with an input end of the ninth one-way liquid valve, and an output end of the ninth one-way liquid valve is connected with an input end of the refrigerator; an output end of the refrigerator is connected with an input end of the second optional liquid pump, and an output end of the second optional liquid pump is connected with an input end of the hydrate storage reservoir.

5. The production and transportation system for the natural gas hydrates according to claim 4, wherein the hydrate storage reservoir adopts a semi-underground storage reservoir, and a temperature control range of the semi-underground storage reservoir is 273.15K-293.15K.

6. The production and transportation system for the natural gas hydrates according to claim 1, wherein the living quarter/surrounding user comprises a radiator/floor radiator and shower water.

7. The production and transportation system for the natural gas hydrates according to claim 1, wherein the plurality of hydrate storage and transportation tanks are gas hydrate production and transportation-integrated tanks, and the plurality of hydrate storage and transportation tanks are detachably installed on the natural gas hydrate transportation vehicle.

* * * * *